US010094355B2

(12) United States Patent
Kanemoto et al.

(10) Patent No.: US 10,094,355 B2
(45) Date of Patent: Oct. 9, 2018

(54) WATER TURBINE GENERATOR (71) Applicant: KYOWA ENGINEERING CONSULTANTS CO., LTD., Tokyo (JP)

(72) Inventors: Toshiaki Kanemoto, Fukuoka (JP); Isao Samura, Tokyo (JP)

(73) Assignee: Kyowa Engineering Consultants Co., Ltd., Tokyo (JP)

( * ) Notice: Subject to any disclaimer, the term of this patent is extended or adjusted under 35 U.S.C. 154(b) by 136 days.

(21) Appl. No.: 14/421,168

(22) PCT Filed: Oct. 3, 2012

(86) PCT No.: PCT/JP2012/075609
§ 371 (c)(1),
(2) Date: Feb. 12, 2015

(87) PCT Pub. No.: WO2014/054126
PCT Pub. Date: Apr. 10, 2014

(65) Prior Publication Data
US 2015/0345461 A1 Dec. 3, 2015

(51) Int. Cl.
*F01D 15/10* (2006.01)
*F02C 6/00* (2006.01)
(Continued)

(52) U.S. Cl.
CPC .......... *F03B 3/04* (2013.01); *F03B 3/12* (2013.01); *F03B 11/02* (2013.01); *F03B 13/08* (2013.01);
(Continued)

(58) Field of Classification Search
CPC .... F03B 3/04; F03B 3/12; F03B 11/02; F03B 13/06; F03B 13/08; F03B 13/083
(Continued)

(56) References Cited

U.S. PATENT DOCUMENTS 1,494,008 A * 5/1924 Nagler .................. F03B 13/06
290/4 D
2,163,102 A * 6/1939 Odill ........................ F03B 1/04
290/54
(Continued)

FOREIGN PATENT DOCUMENTS

CN          201090357 Y       7/2008
DE          103 38 395        3/2005
(Continued)

OTHER PUBLICATIONS

Office Action issued in co-pending related U.S. Appl. No. 14/421,185 dated Mar. 8, 2016.
(Continued)

*Primary Examiner* — Tulsidas C Patel
*Assistant Examiner* — Thomas Quigley
(74) *Attorney, Agent, or Firm* — Griffin and Szipl PC (57) ABSTRACT

[Object of the Invention] An object of the present invention is to provide a water turbine power generator comprising a power generation mechanism provided with a water turbine unit and a power generator unit, and a locking mechanism for engaging the power generation mechanism with a support member, which is free from various drawbacks such as increase in size of the locking mechanism, difficulty of detaching the locking mechanism from a damming board forming the support member when the water turbine power generator is serviced, and so forth.
[Disclosure of the Invention] A water turbine power generator comprises a power generation mechanism and a locking mechanism for engaging the power generation mechanism with a support member, wherein the power generation mechanism comprises a water turbine unit and a power generator unit, wherein the water turbine unit comprises a vertically extending cylindrical casing provided (Continued)

with a water inlet port at an upper part of a circumferential side wall and a water outlet port at a lower end, and impellers installed in the cylindrical casing, and wherein the locking mechanism engages the cylindrical casing of the water turbine unit with a damming board which is installed in a canal to form a support member, and wherein the water turbine unit is provided with a pair of impellers disposed coaxially in the cylindrical casing with blades of one of the pair of impellers and blades of the other of the pair of impellers twisted in opposite directions relative to the extending direction of the central axis of the impellers, the power generator unit comprises an inner/outer double rotational armatures-type power generator, and wherein one of the pair of impellers is connected to one of the inner/outer rotational armatures of the power generator unit and the other of the pair of impellers is connected to the other of the inner/outer rotational armatures of the power generator unit, and the locking mechanism engages the power generation mechanism with the support member without fixing the power generation mechanism to the support member.

10 Claims, 4 Drawing Sheets

(51) Int. Cl.
*F03B 3/04* (2006.01)
*F03B 13/10* (2006.01)
*F03B 3/12* (2006.01)
*H02K 7/18* (2006.01)
*F03B 11/02* (2006.01)
*F03B 13/08* (2006.01)

(52) U.S. Cl.
CPC .......... *F03B 13/10* (2013.01); *H02K 7/1823* (2013.01); *F05B 2220/20* (2013.01); *F05B 2230/80* (2013.01); *F05B 2250/315* (2013.01); *F05B 2260/30* (2013.01); *Y02E 10/22* (2013.01); *Y02E 10/223* (2013.01); *Y02E 10/226* (2013.01); *Y02P 70/525* (2015.11)

(58) Field of Classification Search
USPC ............................................. 290/43, 52, 54
See application file for complete search history.

(56) References Cited

U.S. PATENT DOCUMENTS

| | | | |
|---|---|---|---|
| 2,501,696 A | 3/1950 | Souczek | |
| 2,801,069 A * | 7/1957 | Campbell | F03B 13/08 415/68 |
| 3,097,491 A * | 7/1963 | Pugh | F03B 13/08 248/223.31 |
| 4,165,467 A * | 8/1979 | Atencio | F03B 13/08 290/52 |
| 4,219,303 A | 8/1980 | Mouton, Jr. et al. | |
| 4,613,279 A | 9/1986 | Corren et al. | |
| 5,780,935 A * | 7/1998 | Kao | F01D 5/141 290/52 |
| 5,931,737 A | 8/1999 | Aota et al. | |
| 6,806,586 B2 | 10/2004 | Wobben | |
| 7,102,249 B2 | 9/2006 | Wobben | |
| 7,199,484 B2 | 4/2007 | Brashears | |
| 8,070,444 B2 | 12/2011 | Clarke et al. | |
| 8,264,096 B2 | 9/2012 | Micu | |
| 8,664,790 B2 | 3/2014 | Cornelius et al. | |
| 8,742,612 B1 | 6/2014 | Robbins et al. | |
| 2005/0023837 A1 | 2/2005 | Wobben | |
| 2005/0173937 A1 | 9/2005 | Aukon | |
| 2005/0285407 A1 * | 12/2005 | Davis | F03B 3/128 290/54 |
| 2006/0093482 A1 | 5/2006 | Wacinski | |
| 2006/0125242 A1 | 6/2006 | Fraenkel | |
| 2006/0269362 A1 | 11/2006 | Henriksen | |
| 2007/0007772 A1 | 1/2007 | Brashears | |
| 2010/0230971 A1 | 9/2010 | Mackie | |
| 2010/0259050 A1 | 10/2010 | Meller | |
| 2010/0326343 A1 | 12/2010 | Hunt | |
| 2010/0332041 A1 | 12/2010 | Hunt | |
| 2012/0074712 A1 | 3/2012 | Bursal | |
| 2012/0133140 A1 | 5/2012 | Cornelius et al. | |
| 2012/0169054 A1 * | 7/2012 | Roos | F03B 3/04 290/52 |
| 2013/0106105 A1 | 5/2013 | Dehlsen et al. | |
| 2015/0033722 A1 * | 2/2015 | Layton | F03B 15/14 60/327 |

FOREIGN PATENT DOCUMENTS

| | | |
|---|---|---|
| JP | 2001-153021 A | 6/2001 |
| JP | 2001-221141 A | 8/2001 |
| JP | 2001221141 A * | 8/2001 |
| JP | 2005-506824 A | 3/2005 |
| JP | 2007-016786 A | 1/2007 |
| JP | 2007-170282 A | 7/2007 |
| JP | 2008-063961 A | 3/2008 |
| JP | 2008-63961 A | 3/2008 |
| JP | 3145233 U | 9/2008 |
| JP | 4458641 B2 | 4/2010 |
| JP | 2010-101263 A | 5/2010 |
| JP | 2010-174678 A | 8/2010 |
| JP | 2011-122508 A | 6/2011 |
| JP | 2012-092651 A | 5/2012 |
| JP | 2012-525535 A | 10/2012 |
| JP | 2012-532274 A | 12/2012 |
| WO | 81/00595 A1 | 3/1981 |
| WO | 2005/061886 A1 | 7/2005 |
| WO | 2010/125476 A1 | 11/2010 |

OTHER PUBLICATIONS

Office Action issued in co-pending related U.S. Appl. No. 14/421,176 dated Mar. 10, 2016.
Search Report issued in corresponding EP application 12886092.1, completed Jan. 15, 2016 and dated Jan. 27, 2016.
Search Report issued in related EP application 13876822.1, completed Jan. 15, 2016 and dated Jan. 27, 2016.
Search Report issued in related EP application 12886697.7,completed Jan. 15, 2016 and dated Jan. 27, 2016.
Written opinion of the International Searching Authority issued in corresponding application PCT/JP2012/075609, completed Dec. 12, 2012 and dated Dec. 25, 2012.
International Search Report issued in corresponding application PCT/JP2012/075609, completed Dec. 12, 2012 and dated Dec. 25, 2012.
International Search Report issued in related application PCT/JP2012/076785, completed on Dec. 12, 2012 and dated Dec. 25, 2012.
Written opinion by the International Searching Authority issued in related application PCT/JP2012/076785, completed on Dec. 12, 2012 and dated Dec. 25, 2012.
International Search Report issued in related application PCT/JP2013/055954, completed Jun. 3, 2013 and dated Jun. 11, 2013.
Written opinion of the International Searching Authority issued in related application PCT/JP2013/055954, completed Jun. 3, 2013 and dated Jun. 11, 2013.
Notice of Allowance issued in co-pending related U.S. Appl. No. 14/421,176 dated Aug. 17, 2016.

* cited by examiner

WATER TURBINE GENERATOR

This is a National Phase application in the United States of International Patent Application No. PCT/JP2012/075609 filed Oct. 3, 2012. The entire disclosure of the above patent application is hereby incorporated by reference.

TECHNICAL FIELD

The present invention relates to a water turbine power generator.

BACKGROUND ART

Patent documents No. 1 and No. 2 disclose water turbine power generators each comprising a power generation mechanism and a locking mechanism for engaging the power generation mechanism with a support member, wherein the power generation mechanism comprises a water turbine unit and a power generator unit, wherein the water turbine unit comprises a vertically extending cylindrical casing provided with a water inlet port at an upper part of a circumferential side wall and a water outlet port at a lower end, and an impeller installed in the cylindrical casing, and wherein the locking mechanism locks the cylindrical casing of the water turbine unit on a damming board which is installed in a canal to form a support member.

PRIOR ART DOCUMENTS

Patent Documents

Patent Document No. 1: Japanese Patent Laid-Open No. 2001-153021

Patent Document No. 2: Japanese Patent Laid-Open No. 2010-174678

DISCLOSURE OF INVENTION

Problem to be Solved

In each aforementioned water turbine power generator, rotation of a fixed armature of the power generator unit must be prevented so as to make reciprocal rotational torques act between the fixed armature of the power generator unit and a rotational armature of the power generator unit which is rotated by the impeller of the water turbine unit, so that rotation of the cylindrical casing must be prevented, and so that the locking mechanism must be capable of firmly fixing the cylindrical casing to the damming board. As a result, there occur various drawbacks such as increase in size of the locking mechanism, difficulty of detaching the locking mechanism from the damming board when the water turbine power generator is serviced, and so forth.

Therefore, an object of the present invention is to provide a water turbine power generator comprising a power generation mechanism and a locking mechanism for engaging the power generation mechanism with a support member, wherein the power generation mechanism comprises a water turbine unit and a power generator unit, wherein the water turbine unit comprises a vertically extending cylindrical casing provided with a water inlet port at an upper part of a circumferential side wall and a water outlet port at a lower end, and an impeller installed in the cylindrical casing, and wherein the locking mechanism engages the cylindrical casing of the water turbine unit with a damming board which is installed in a canal to form a support member, and which is free from various drawbacks such as increase in size of the locking mechanism, difficulty of detaching the locking mechanism from the damming board when the water turbine power generator is serviced, and so forth.

Means for Achieving the Object

In accordance with the present invention, there is provided a water turbine power generator comprising a power generation mechanism and a locking mechanism for engaging the power generation mechanism with a support member, wherein the power generation mechanism comprises a water turbine unit and a power generator unit, wherein the water turbine unit comprises a vertically extending cylindrical casing provided with a water inlet port at an upper part of a circumferential side wall and a water outlet port at a lower end, and impellers installed in the cylindrical casing, and wherein the locking mechanism locks the cylindrical casing of the water turbine unit on a damming board which is installed in a canal to form a support member, and wherein the water turbine unit is provided with a pair of impellers disposed coaxially in the cylindrical casing with blades of one of the pair of impellers and blades of the other of the pair of impellers twisted in opposite directions relative to an extending direction of the central axis of the impellers, the power generator unit comprises an inner/outer double rotational armatures-type power generator, and wherein one of the pair of impellers is connected to one of the inner/outer rotational armatures of the power generator unit and the other of the pair of impellers is connected to the other of the inner/outer rotational armatures of the power generator unit, and the locking mechanism engages the power generation mechanism with the support member without fixing the power generation mechanism to the support member.

In the water turbine power generator in accordance with the present invention, electric power is generated using a head between a water level of a canal upstream of a damming board and a water level of a canal downstream of the damming board. A current of water in the canal upstream of the damming board passes over the damming board, and all or part of the water current flows into the cylindrical casing of the water turbine power generator through the water inlet port, flows down the cylindrical casing to rotate impellers in directions opposite to each other, flows out the cylindrical casing through the water outlet port, and flows down the canal downstream of the damming board.

The pair of impellers disposed coaxially in the cylindrical casing with blades of one of the pair of impellers and blades of the other of the pair of impellers twisted in opposite directions relative to the extending direction of the central axis of the impellers rotate in directions opposite to each other, the rotations are transmitted to the inner/outer double rotational armatures of the power generator unit to rotate the inner/outer double rotational armatures in directions opposite to each other, and electric power is generated. During power generation, reciprocal rotational torques acting between the inner/outer double rotational armatures become equal to each other, so that reciprocal rotational torques acting between an inner rotary system formed by the inner rotational armature and the impeller connected to the inner rotational armature and an outer rotary system formed by the outer rotational armature and the impeller connected to the outer rotational armature become equal so as to cancel each other.

In the water turbine power generator in accordance with the present invention, no rotational torque is generated in the cylindrical casing as reaction because, during power generation, reciprocal rotational torques acting between the inner rotary system formed by the inner rotational armature and the impeller connected to the inner rotational armature and an outer rotary system formed by the outer rotational armature and the impeller connected to the outer rotational armature become equal to cancel each other. Therefore, the locking mechanism does not need to firmly fix the cylindrical casing to the damming board but only has to engage the cylindrical casing with the damming board. Therefore, the water turbine power generator in accordance with the present invention is free from various drawbacks such as increase in size of the locking mechanism, difficulty of detaching the locking mechanism from the damming board when the water turbine power generator is serviced, and so forth.

In accordance with a preferred aspect of the present invention, the locking mechanism comprises a channel member for fitting on an upper end of the damming board.

In accordance with a preferred aspect of the present invention, the locking mechanism comprises a hook member provided with a leg portion for passing through a notch formed on an upper end of the damming board and a head portion for abutting an end face of the damming board directed to the upstream side of the canal.

In accordance with a preferred aspect of the present invention, the locking mechanism comprises an arm member provided with a hole through which a projection provided at an upper end of the damming board is passed.

Preferable examples of mechanism which can engage the power generation mechanism with a support member without fixing the power generation mechanism to the support member include, are, among others, the one comprising a channel member for fitting on an upper end of the damming board, the one comprising a hook member provided with a leg portion for passing through a notch formed on an upper end of the damming board and a head portion for abutting an end face of the damming board directed to the upstream side of the canal, and the one comprising an arm member provided with a hole through which a projection provided at an upper end of the damming board is passed. The aforementioned mechanisms are preferable because their structures are simple.

In accordance with a preferred aspect of the present invention, the locking mechanism is independent of the power generation mechanism and detachably fixed to the power generation mechanism.

The locking mechanism should be optimized in response to the condition of a canal in which the water turbine power generator is installed or condition of the damming board. Therefore, the locking mechanism is desirably independent of the power generation mechanism and detachably fixed to the power generation mechanism.

In accordance with a preferred aspect of the present invention, the locking mechanism has a framework structure.

When the locking mechanism has a framework structure, resistance of the locking mechanism to a water current is reduced to the utmost and the load impressed on the damming board from the locking mechanism is reduced.

In accordance with a preferred aspect of the present invention, the water turbine power generator further comprises an adjusting mechanism for adjusting relative position in vertical direction between the cylindrical casing of the water turbine unit and an engaging part of the locking mechanism for engaging the damming board.

The water turbine power generator further preferably comprises an adjusting mechanism for adjusting relative position in vertical direction between the cylindrical casing of the water turbine unit and an engaging part of the locking mechanism for engaging the damming board so as to optimize the height level of the water inlet port of the power generation mechanism relative to the water plane of the canal upstream of the damming board.

In accordance with a preferred aspect of the present invention, the locking mechanism comprises a supporting leg abutting a bottom of the canal at a lower end and can be adjusted in length.

The locking mechanism preferably comprises a supporting leg abutting a bottom of the canal at a lower end and adjustable in length so as to stabilize the installation of the water turbine power generator.

In accordance with a preferred aspect of the present invention, the water turbine unit comprises a water collecting pipe extending from the water inlet port in a direction radially outward of the cylindrical casing and widened in the extending direction.

When a water collecting pipe is disposed, flow rate of water current flowing into the cylindrical casing increases.

In accordance with a preferred aspect of the present invention, the lower end portion of the cylindrical casing forms a discharging pipe widened toward the lower end of the cylindrical casing.

When the lower end portion of the cylindrical casing forms a discharging pipe widened toward the lower end of the cylindrical casing, loss of the water outlet port decreases and flow rate of water current flowing into the cylindrical casing increases due to promotion of siphon effect.

In accordance with a preferred aspect of the present invention, the cylindrical casing is made of transparent material at a portion opposing the impellers.

When the cylindrical casing is made of transparent material at a portion opposing the impellers, maintenance of the impellers becomes easy.

In accordance with a preferred aspect of the present invention, the power generator unit is located above the cylindrical casing.

When the power generator unit is located above the cylindrical casing, the power generator unit is prevented from contacting the water current.

MODES FOR CARRYING OUT THE INVENTION

A water turbine power generator in accordance with a preferred embodiment of the present invention will be described.

Figure 1:
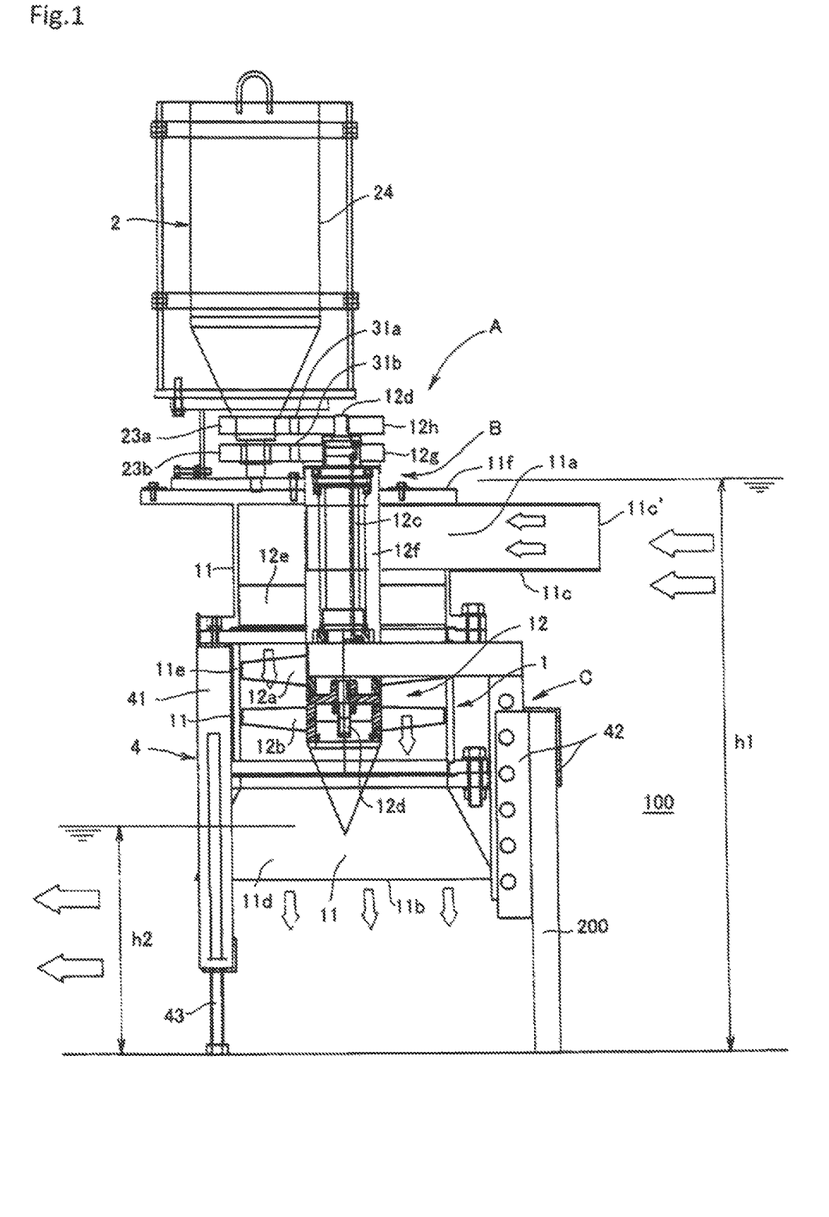
FIG. 1 is a side view of a water turbine power generator in accordance with a preferred embodiment of the present invention, wherein a part thereof is shown in sectional view.

As shown in FIG. 1, a water turbine power generator A comprises a power generation mechanism B and a locking mechanism C for engaging the power generation mechanism B with a support member.

Figure 2:
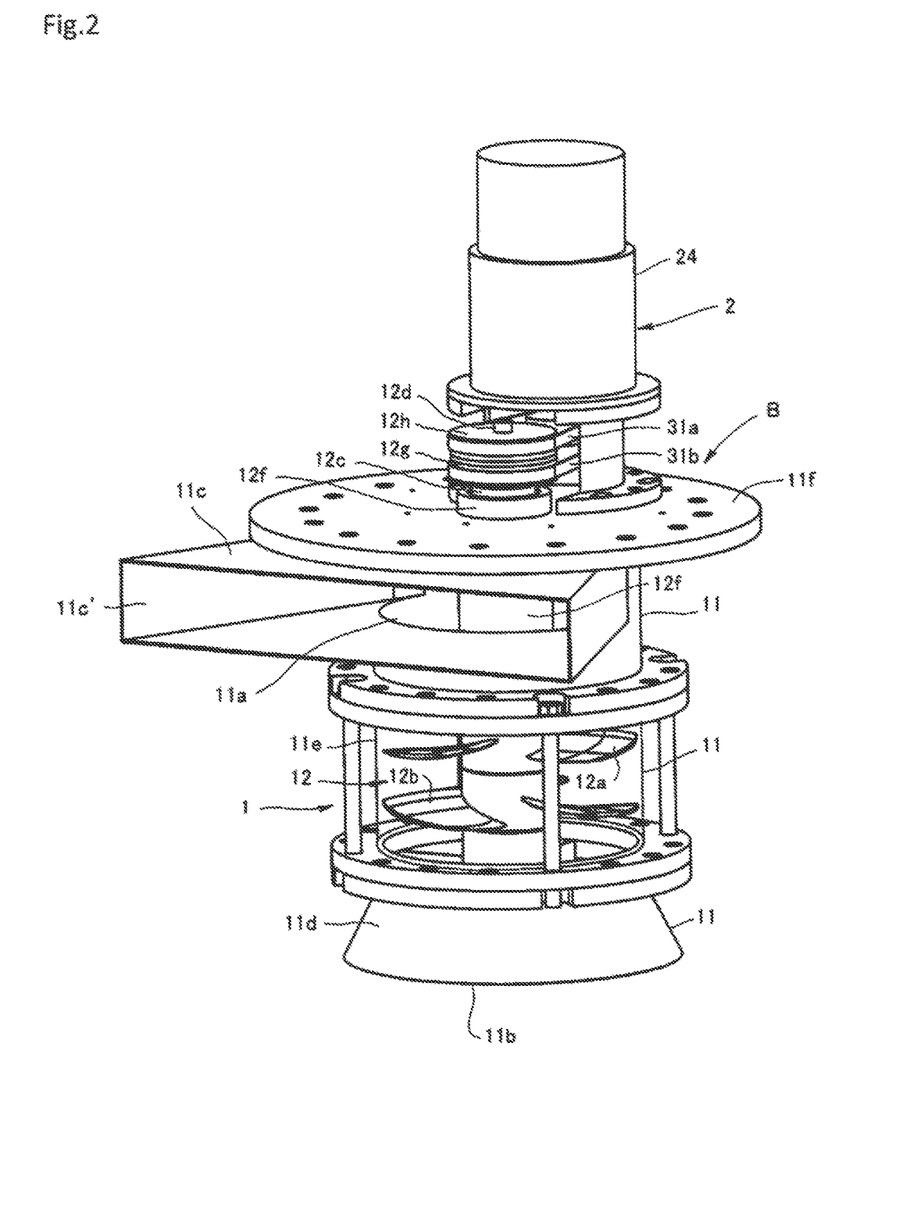
FIG. 2 is a perspective view of a power generation mechanism of a water turbine power generator in accordance with a preferred embodiment of the present invention.
Figure 3:
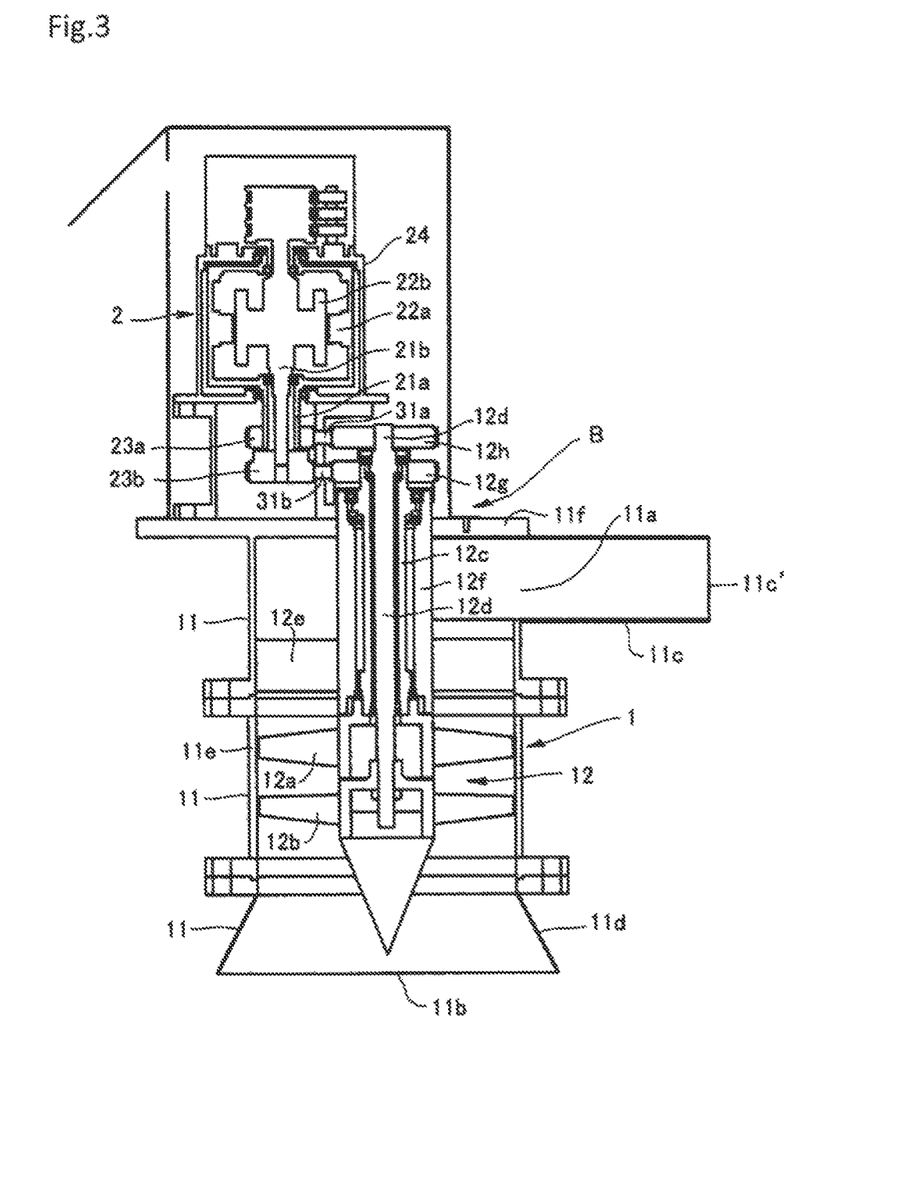
FIG. 3 is a vertical sectional view of a power generation mechanism of a water turbine power generator in accordance with a preferred embodiment of the present invention.

As shown in FIGS. 1 to 3, the power generation mechanism B comprises a water turbine unit 1 comprising a vertically extending cylindrical casing 11 provided with a water inlet port 11a at an upper part of a circumferential side wall and a water outlet port 11b at a lower end, an impeller assembly 12 disposed in the cylindrical casing 11, and a power generator unit 2.

A flat water collecting pipe 11c extending from the water inlet port 11a radially outward and widened in the extending direction (narrowed in the direction of water current) is fixed to the cylindrical casing 11. A lower end portion of the cylindrical casing 11 forms a discharging pipe 11d widened toward the lower end of the cylindrical casing 11.

The cylindrical casing 11 is made of transparent material at a portion 11e opposing the impeller assembly 12.

The impeller assembly 12 comprises a pair of impellers 12a and 12b disposed coaxially with blades of one of the pair of impellers and blades of the other of the pair of impellers twisted in directions opposite to each other relative to the extending direction of the central axis of the impellers. The impeller 12a, which is the upper of the pair, is fixed to a lower end portion of a vertically extending outer cylindrical shaft 12c and the impeller 12b, which is the lower, is fixed to a lower end of a vertically extending inner shaft 12d passed through the outer shaft 12c. The outer shaft 12c is supported rotatably around a central axis and vertically immovably by a vertically extending support cylinder 12f disposed in the cylindrical casing 11 and fixed to the cylindrical casing 11 by arm members 12e. The inner shaft 12d is supported rotatably around a central axis and vertically immovably by the outer shaft 12c.

The support cylinder 12f pierces a top plate 11f closing an upper end of the cylindrical casing 11 and extends upward. The outer shaft 12c extends upward above a top of the support cylinder 12f. A pulley 12g is fixed to the upper end of the outer shaft 12c. The inner shaft 12d pierces the pulley 12g and extends upward. A pulley 12h is fixed to the upper end of the inner shaft 12d.

The power generator unit 2 is formed by an inner/outer double rotational armatures-type synchronous generator comprising a vertically extending cylindrical outer shaft 21a, a vertically extending inner shaft 21b passed through the outer shaft 21a, an outer rotational armature 22a fixed to the outer shaft 21a, an inner rotational armature 22b fixed to the inner shaft 21b and opposing the outer rotational armature 22a, a pulley 23a fixed to a lower end of the outer shaft 21a, a pulley 23b fixed to a lower end of the inner shaft 21b extending downward below the lower end of the outer shaft 21a, and a cylindrical casing 24 accommodating the aforementioned members.

The generator unit 2 is located above the cylindrical casing 11 of the water turbine unit 1.

The pulley 23a of the generator unit 2 operably engages the pulley 12h of the water turbine unit 1 through an endless belt 31a and the pulley 23b of the generator unit 2 operably engages the pulley 12g of the water turbine unit 1 through an endless belt 31b.

The locking mechanism C is formed independent of the power generation mechanism B as shown in FIG. 1. The locking mechanism C is formed by a framework structure 4 comprising a frame body 41 detachably fixed to the lower part of the cylindrical casing 11 by bolts and nuts, a channel member 42 fixed to the frame body 41 to be adjustable in vertical position relative to the frame body 41, by a plurality of vertically aligned mounting holes formed in the frame body 41, a plurality of vertically aligned mounting holes formed in the channel member 42, bolts passed through the mounting holes and nuts screwed on the bolts, and supporting legs 43 extending vertically and attached to the frame body 41 to be adjustable in the length of a portion projecting downward from the lower end of the frame body 41.

The locking mechanism C engages the power generation mechanism B with a damming board 200 by fitting the channel member 42 on the top of the damming board 200 set up in a canal 100. The power generation mechanism B is located at a position downstream of the damming board 200 relative to water current in the canal 100. The support legs 43 abut a bottom surface of a part of the canal 100 downstream of the damming board 200 at lower ends.

When the power generation mechanism B is engaged with the damming board 200, a front opening 11c' of the water collecting pipe 11c is directed upstream relative to water current in the canal 100.

Operation of the water turbine power generator A will be described.

When the damming board 200 is set up as shown in FIG. 1, a head occurs between water level h1 of the canal upstream of the damming board and water level h2 of the canal downstream of the damming board.

As shown by blank arrows in FIG. 1, water current in the canal 100 upstream of the damming board 200 passes over the damming board 200, all or part of the water current flows into the water collection pipe 11c of the water turbine power generator A, then flows into the cylindrical casing 11 through the water inlet port 11a, flows down the cylindrical casing 11 to rotate the impellers 12a and 12b in directions opposite to each other, flows out of the cylindrical casing 11 through the water outlet port 11b, and flows down the canal 100 downstream of the damming board 200.

The pair of impellers 12a and 12b disposed coaxially with blades of one of them and blades of the other twisted in opposite directions relative to the extending direction of the central axis of the impellers rotate in opposite directions. The rotations of the impellers 12a and 12b are transmitted to the pulleys 12g and 12h through the outer shaft 12c and the inner shaft 12d, accelerated and transmitted to the inner shaft 21b and the outer shaft 21a through the endless belts 31b and 31a and the pulleys 23b and 23a, and the inner rotational armature 22b and the outer rotational armature 22a rotate in directions opposite to each other to generate electric power.

In the water turbine power generator A, during power generation, reciprocal rotational torques impressed on the double rotational armatures 22a and 22b become equal to each other, so that reciprocal rotational torques impressed on an inner rotary system formed by the inner rotational armature 22b and the inner shaft 21b, the outer shaft 12c and the impeller 12a which are connected to the inner rotational armature 22b and an outer rotary system formed by the outer rotational armature 22a and the outer shaft 21b, the inner shaft 12d and the impeller 12b which are connected to the outer rotational armature 22a become equal so as to cancel each other.

In the water turbine power generator A, no rotational torque is generated in the cylindrical casing 11 as a reaction because, during power generation, reciprocal rotational torques impressed on the inner rotary system formed by the inner rotational armature 22b and the inner shaft 21b, the outer shaft 12c and the impeller 12a which are connected to the inner rotational armature 22b and the outer rotary system formed by the outer rotational armature 22a and the outer shaft 21b, the inner shaft 12d and the impeller 12b which are connected to the outer rotational armature 22a become equal so as to cancel each other. Therefore, the locking mechanism C does not need to firmly fix the cylindrical casing 11 to the damming board 200 but only has to engage the cylindrical casing 11 with the damming board 200. The channel member 42 fitting on the upper end of the damming board 200 preferably engages the cylindrical casing 11 with the damming board 200 without fixing the cylindrical casing 11 to the damming board 200. Therefore, the water turbine power generator A of the present invention, wherein the cylindrical casing 11 is engaged with the damming board 200 without being fixed to the damming board 200, is free from various drawbacks such as increase in size of the locking mechanism C, difficulty of detaching the locking mechanism C from the damming board 200 when the water turbine power generator A is serviced, and so forth.

The locking mechanism C should be optimized in response to conditions of the canal 100 in which the water turbine power generator A is installed or conditions of the damming board 200, such as flow speed of the water current in the canal, thickness of the damming board, and so forth. Therefore, the locking mechanism C is preferably independent of the power generation mechanism B and detachably fixed to the power generation mechanism B.

When the locking mechanism C is the framework structure 4, resistance of the locking mechanism C to the water current is reduced to the utmost and the load impressed on the damming board 200 from the locking mechanism C is reduced.

The water turbine power generator A preferably comprises an adjusting mechanism for adjusting vertical position relative to the cylindrical casing 11 of the water turbine unit of the engaging part of the locking mechanism C with the damming board 200, more specifically, the channel member 42 fitting on the top of the damming board 200, so as to optimize the height level of the water inlet port 11a of the power generation mechanism B relative to the water surface of the canal 100 upstream of the damming board 200.

The locking mechanism C preferably comprises supporting legs 43 each abutting a bottom of the canal 100 at a lower end and adjustable in length so as to stabilize the installation of the water turbine power generator A.

When the water collecting pipe 11c widened in the extending direction is disposed, flow rate of water current flowing into the cylindrical casing 11 increases.

When the discharging pipe 11d widened toward the lower end is disposed, water current speed decreases at the water outlet port 11b, loss of the water turbine unit 1 decreases, water current speed increases to decrease hydrostatic pressure near the impellers upstream of the water outlet port 11b, and siphon effect is promoted to increase flow rate of water current into the cylindrical casing 11.

When the cylindrical casing 11 is made of transparent material at a portion 11e opposing the impellers 12a and 12b, maintenance of the impellers 12a and 12b become easy.

When the power generator unit 2 is located above the cylindrical casing 11, the power generator unit 2 is prevented from contacting water current and underwater drifts.

Figure 4:
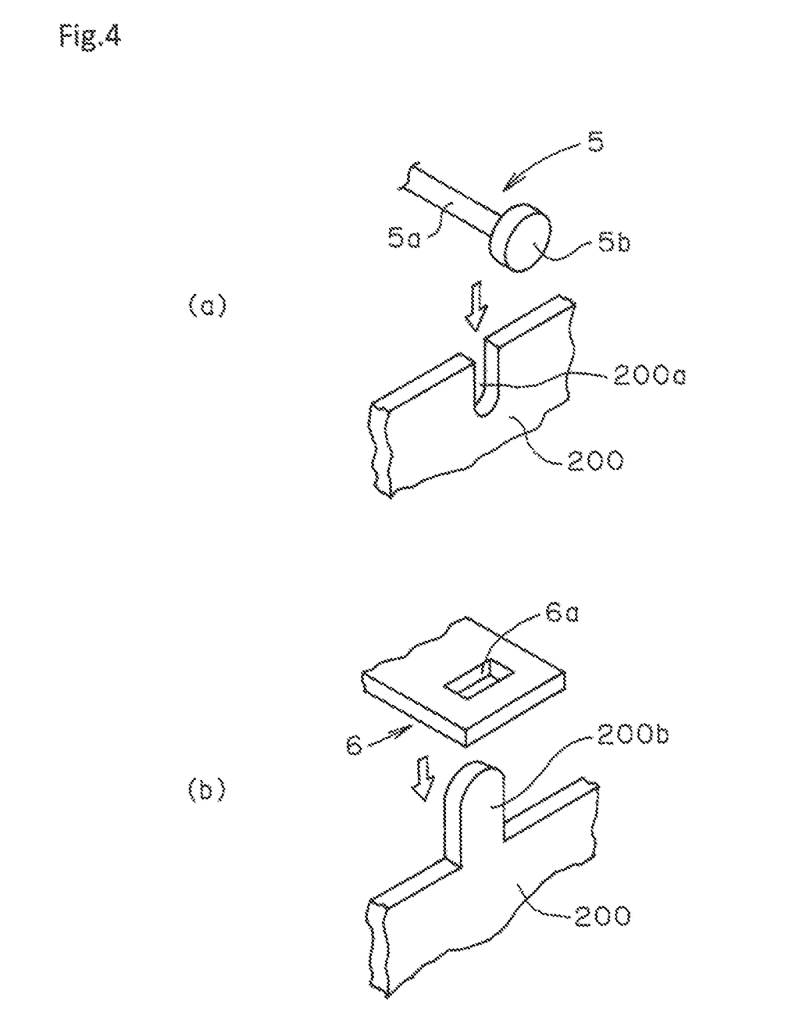
FIG. 4 is a set of perspective views of variations in a locking mechanism of a water turbine power generator in accordance with a preferred embodiment of the present invention.

In the aforementioned preferred embodiment, the locking mechanism comprises the channel member 42 fitting on the upper end of the top of the damming board 200. A locking mechanism shown in FIG. 4(a), which comprises a hook member 5 provided with a leg portion 5a for passing through a notch 200a formed on the upper end of the damming board 200 and a head portion 5b for abutting an end face of the damming board 200 directed to the upstream side of the canal 100, or a locking mechanism shown in FIG. 4(b), which comprises an arm member 6 provided with a hole 6a through which a projection 200b provided at the upper end of the damming board 200 is passed can engage the cylindrical casing 11 with the damming board 200 without fixing the cylindrical casing 11 to the damming board 200.

Locking mechanisms other than the aforementioned ones can also be used for engaging the cylindrical casing 11 with the damming board 200 without fixing the cylindrical casing 11 to the damming board 200.

In the aforementioned preferred embodiment, the channel member 42 and the supporting legs 43 are attached to the water turbine unit 1 through the frame structure 41. However, the channel member 42 and the supporting legs 43 can be directly attached to the water turbine unit 1.

An induction generator can be used instead of the synchronous generator.

INDUSTRIAL APPLICABILITY

The present invention can be widely used for small output water turbine generators installed in small canals such as agricultural irrigation canals, industrial irrigation canals, domestic water canals, small rivers, etc.

BRIEF DESCRIPTION OF THE REFERENCE NUMERALS

A Water turbine power generator
B Power generation mechanism
C Locking mechanism
1 Water turbine unit
2 Power generator unit
4 Frame structure
5 Hook member
6 Arm member
12a, 12b Impeller
22a Outer rotational armature
22b Inner rotational armature
42 Channel member
100 Canal
200 Damming board

The invention claimed is:
1. A water turbine power generator comprising:
a power generation mechanism comprising a water turbine unit and a power generator unit; and
a locking mechanism for engaging the power generation mechanism with a support member,
wherein the water turbine unit comprises a vertically extending cylindrical casing provided with a water inlet port at an upper part of a circumferential side wall and a water outlet port at a lower end, and impellers installed in the cylindrical casing,
wherein the locking mechanism engages the cylindrical casing of the water turbine unit with a damming board which is installed in a canal to form the support member,
wherein the water inlet port is located above a top of the damming board,
wherein the water turbine unit is provided with a pair of impellers disposed coaxially in the cylindrical casing with blades of one of the pair of impellers and blades of the other of the pair of impellers twisted in opposite directions relative to an extending direction of the central axis of the impellers, the power generator unit comprises an inner/outer double rotational armatures-type power generator, wherein one of the pair of impellers is operably connected to one of the inner/outer rotational armatures of the power generator unit and the other of the pair of impellers is operably connected to the other of the inner/outer rotational armatures of the power generator unit so that reciprocal rotational torques acting between the inner rotary system formed by the inner rotational armature and the impeller connected to the inner rotational armature and an outer rotary system formed by the outer rotational armature and the impeller connected to the outer rotational armature become equal to cancel each other for minimizing rotational torque, and the locking mechanism hooks the power generation mechanism on the support member, and wherein the power generator unit is located above the cylindrical casing of the water turbine unit;

the water turbine power generator further comprising an adjusting mechanism for adjusting relative position in vertical direction between the cylindrical casing of the water turbine unit and an engaging part of the locking mechanism for engaging the damming board.

2. A water turbine power generator of claim 1, wherein the locking mechanism comprises a channel member for fitting on an upper end of the damming board.

3. A water turbine power generator of claim 1, wherein the locking mechanism comprises a hook member provided with a leg portion for passing through a notch formed on an upper end of the damming board and a head portion for abutting an end face of the damming board directed to an upstream side of the canal.

4. A water turbine power generator of claim 1, wherein the locking mechanism comprises an arm member provided with a hole through which a projection provided at an upper end of the damming board is passed.

5. A water turbine power generator of claim 1, wherein the locking mechanism is independent of the power generation mechanism and detachably fixed to the power generation mechanism.

6. A water turbine power generator of claim 1, wherein the locking mechanism comprises a supporting leg abutting a bottom of the canal at a lower end and adjustable in length.

7. A water turbine power generator of claim 1, wherein the water turbine unit comprises a water collecting pipe extending from the water inlet port in a direction of radially outward of the cylindrical casing and widened in the extending direction.

8. A water turbine power generator of claim 1, wherein the lower end portion of the cylindrical casing forms a discharging pipe widened toward the lower end of the cylindrical casing.

9. A water turbine power generator of claim 1 wherein the cylindrical casing is made of transparent material at a portion opposing the impellers.

10. A water turbine power generator of claim 1, wherein the power generator unit is located above the cylindrical casing.

\* \* \* \* \*